Dec. 23, 1958  C. A. LEE  2,865,260
FLOW CONTROL APPARATUS
Filed Sept. 22, 1953  11 Sheets-Sheet 3
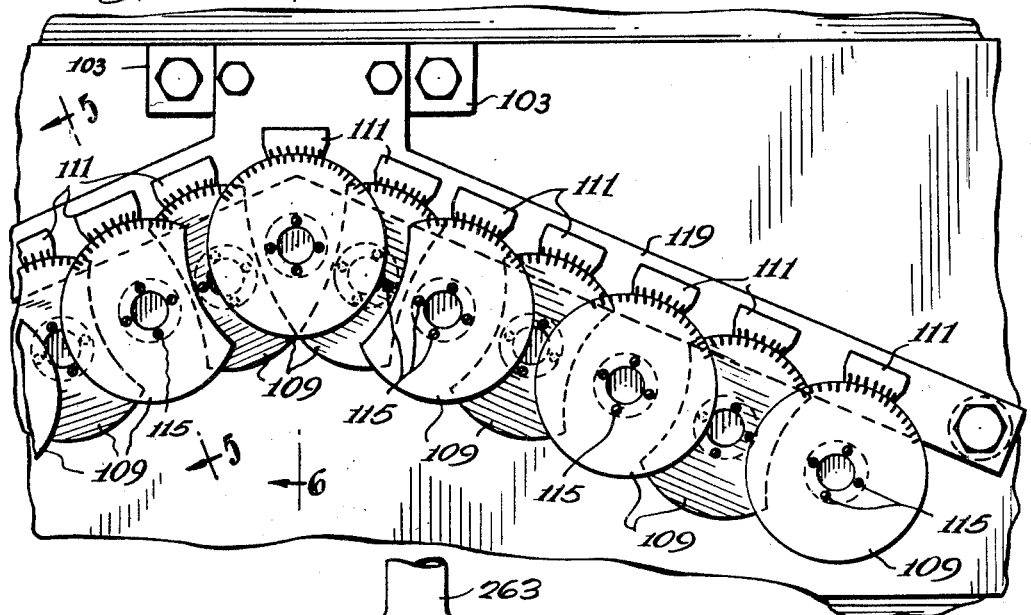
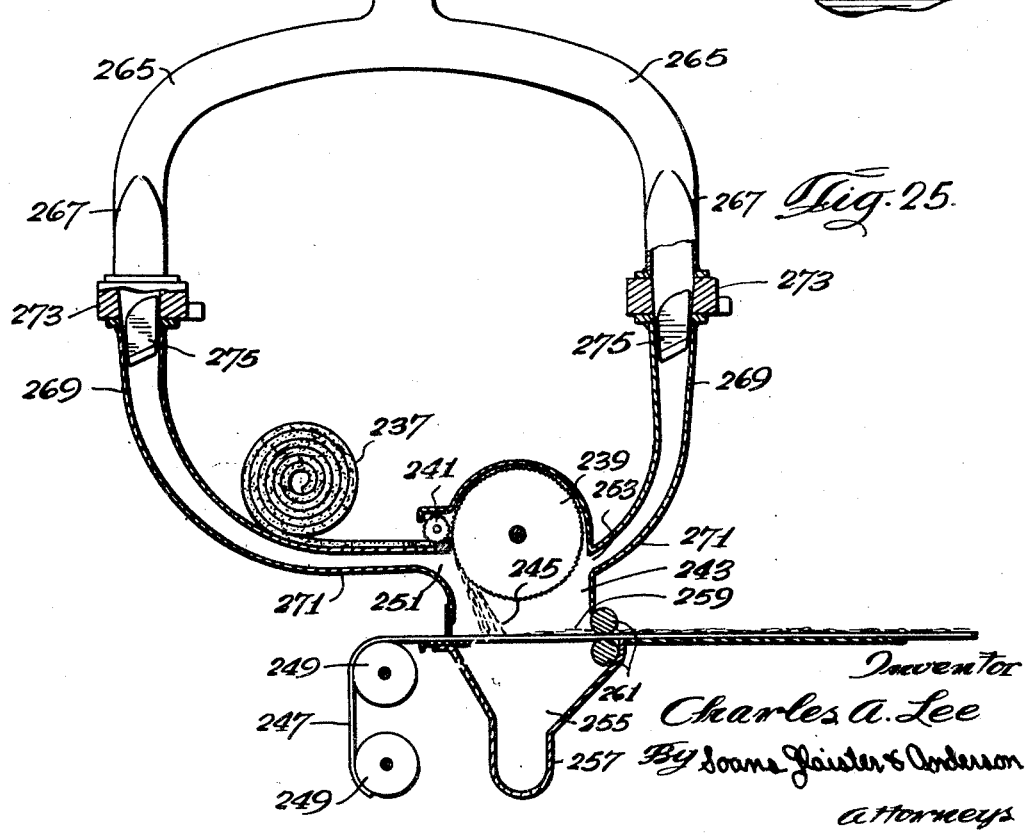
Inventor
Charles A. Lee
By Soans Flauster & Anderson
attorneys

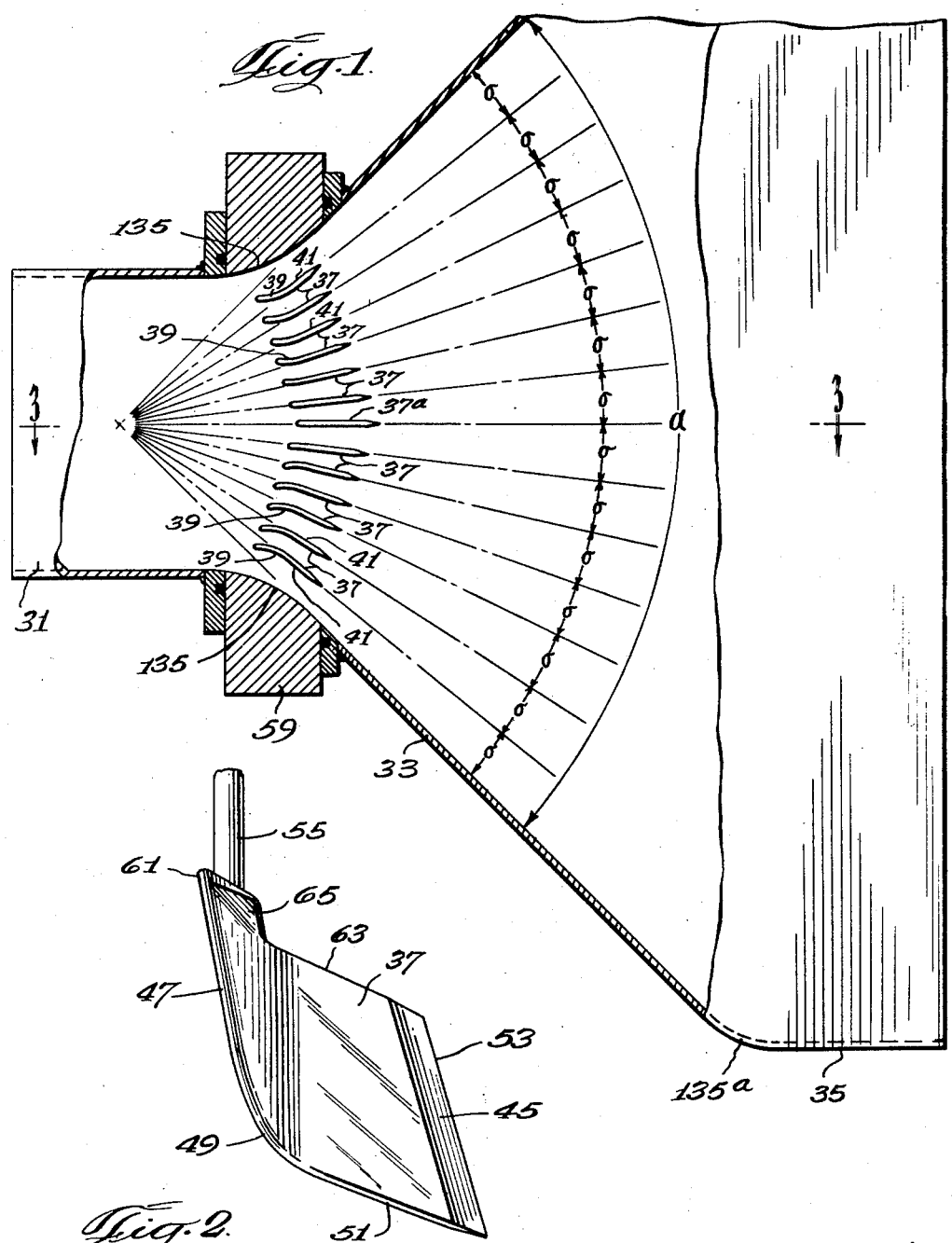

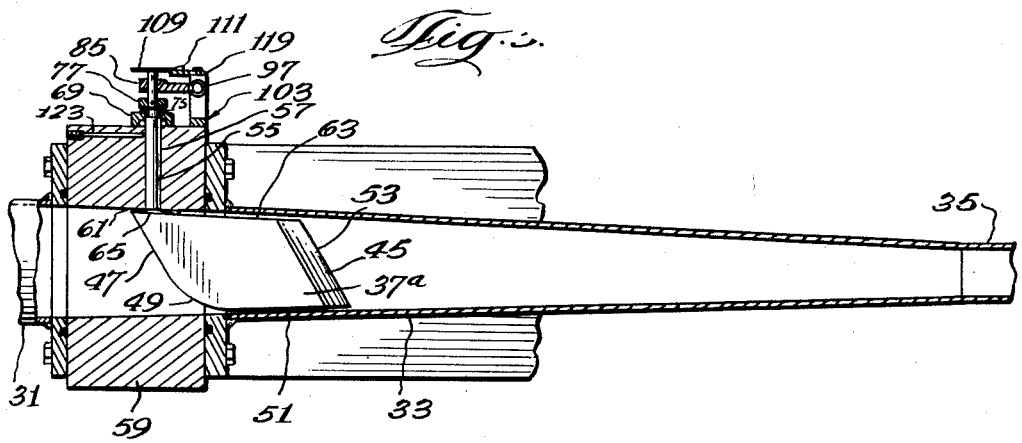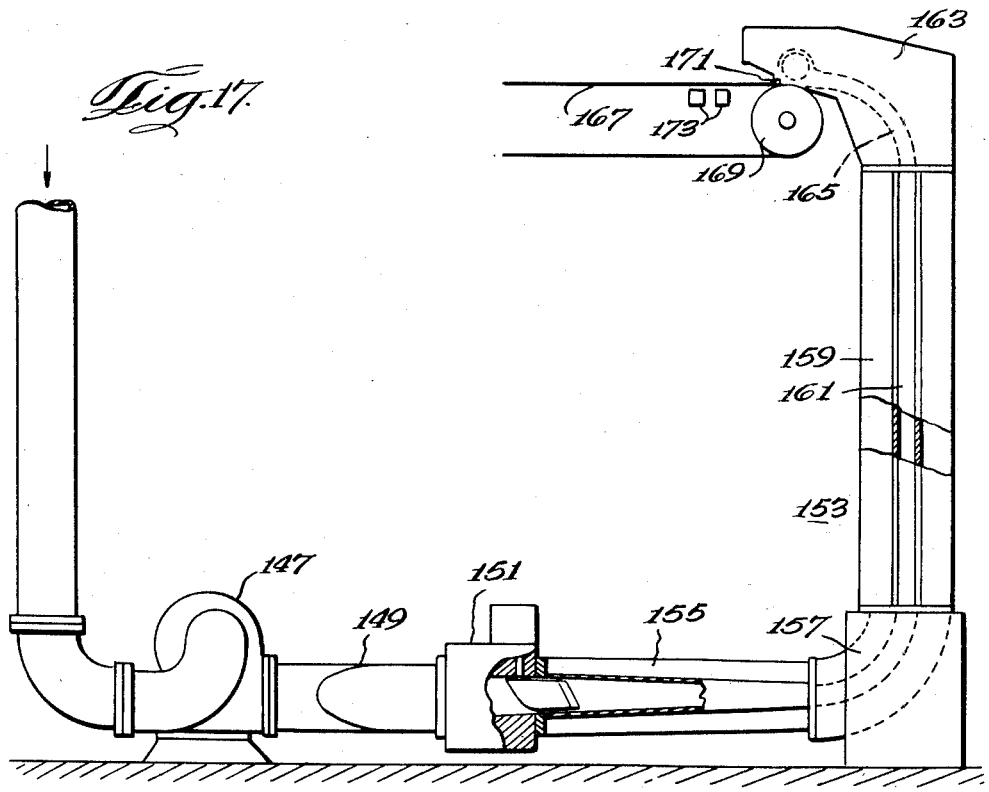

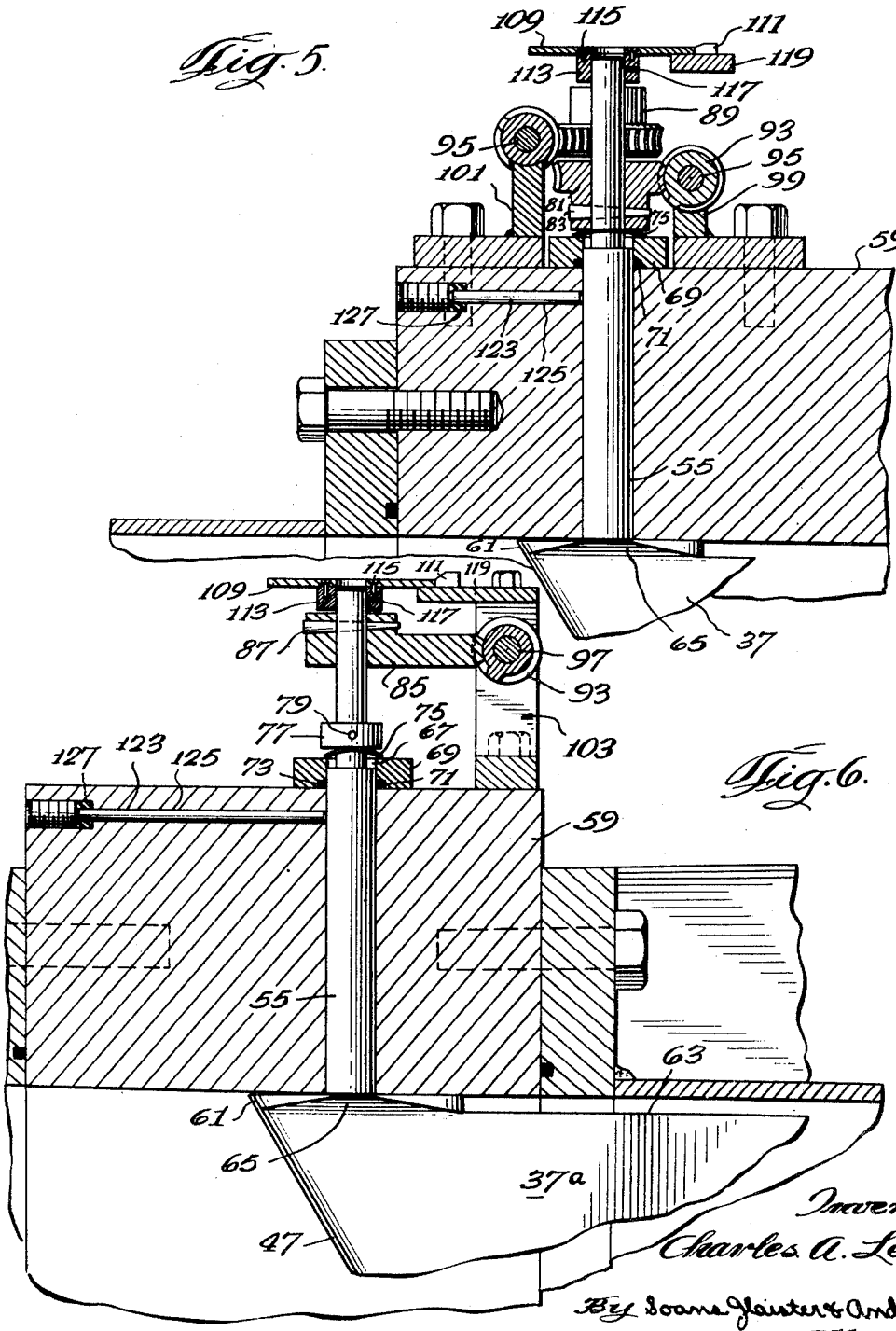

Dec. 23, 1958 C. A. LEE 2,865,260
FLOW CONTROL APPARATUS
Filed Sept. 22, 1953 11 Sheets-Sheet 5
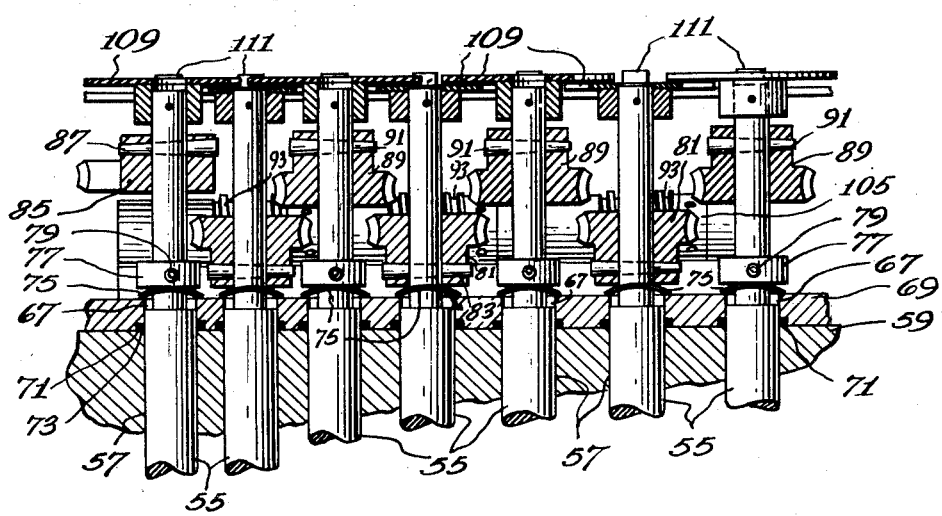
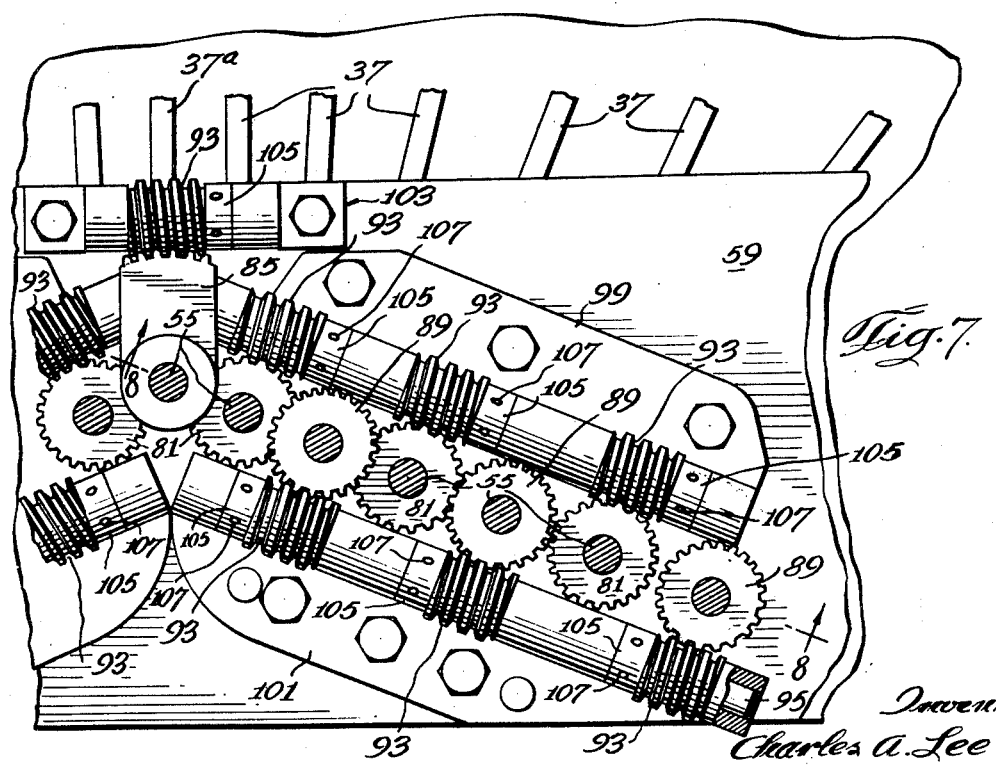
Inventor
Charles A. Lee
By Soans Foister & Anderson
Attorneys Dec. 23, 1958 C. A. LEE 2,865,260
FLOW CONTROL APPARATUS
Filed Sept. 22, 1953 11 Sheets-Sheet 6

Inventor
Charles A. Lee
BY Soans Plaister & Anderson attorneys

Dec. 23, 1958  C. A. LEE  2,865,260
FLOW CONTROL APPARATUS
Filed Sept. 22, 1953  11 Sheets-Sheet 7
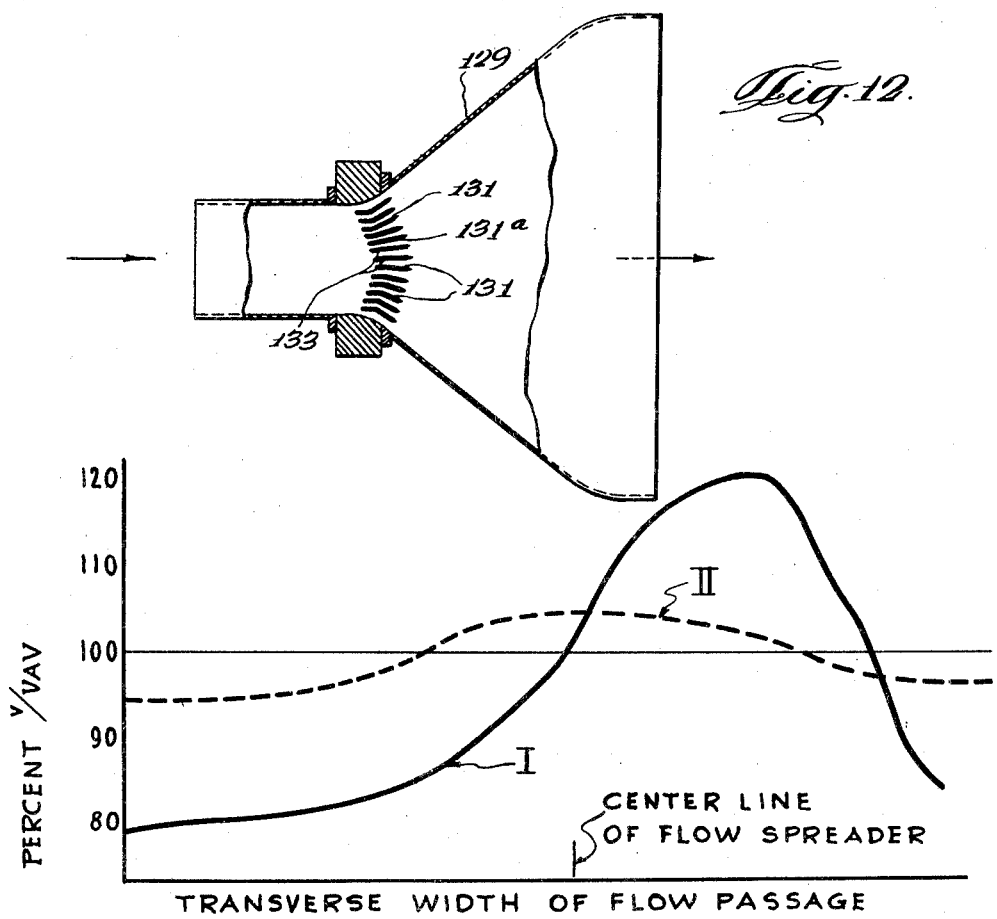
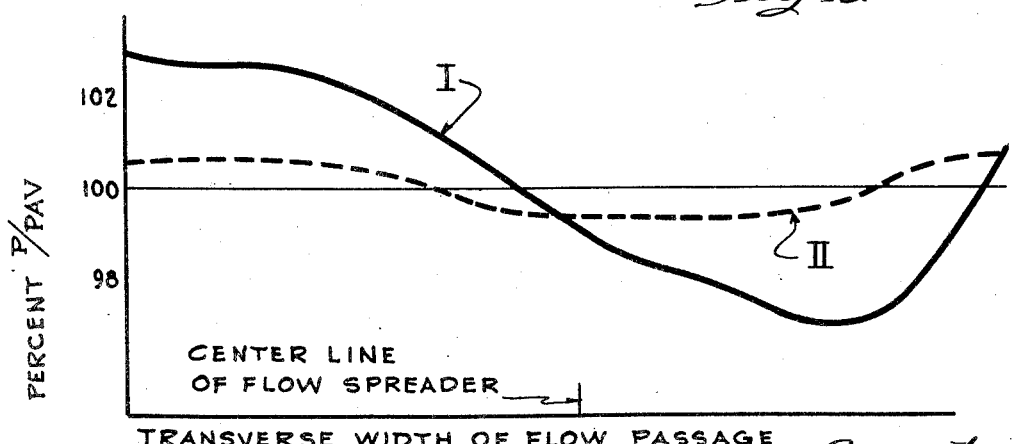

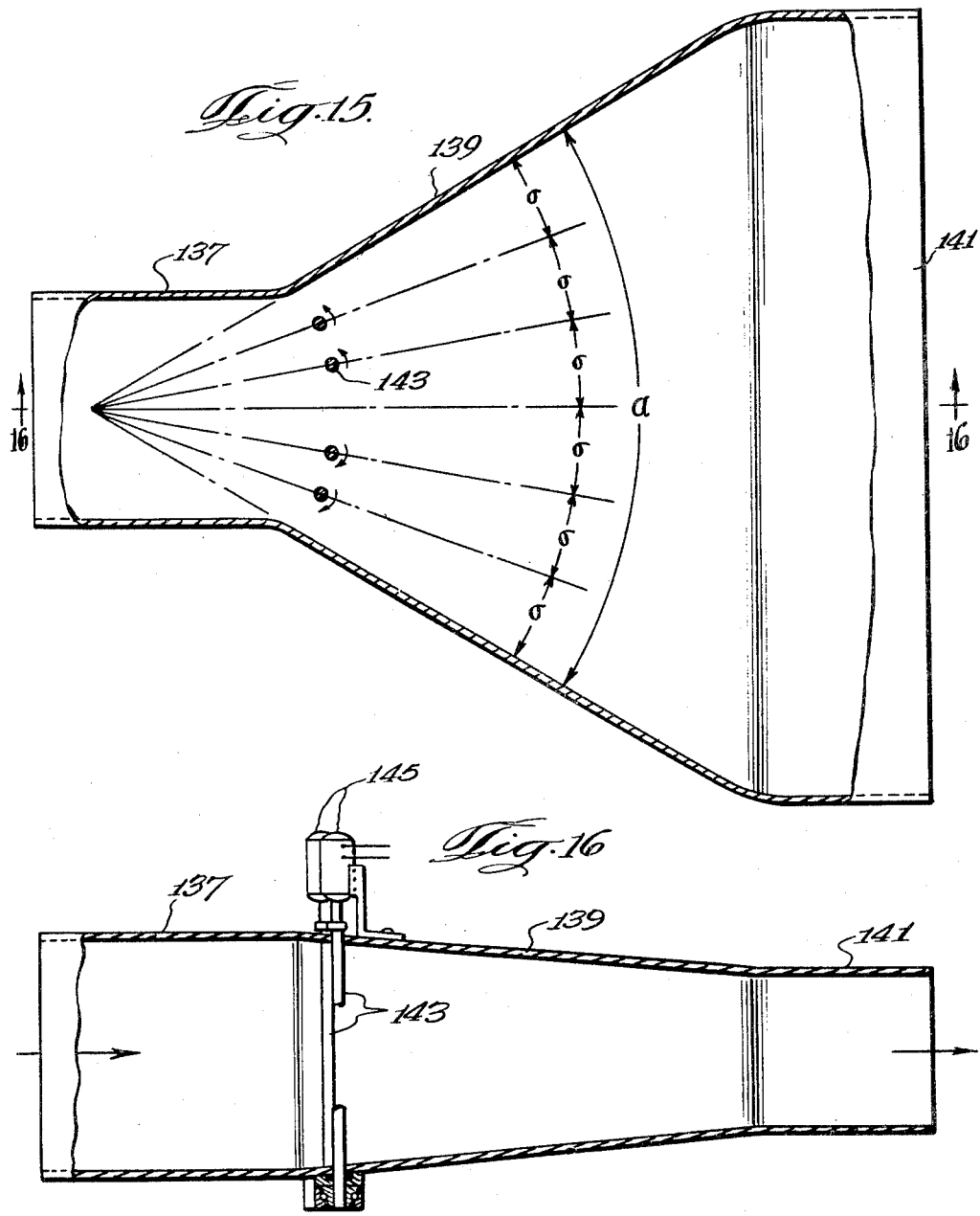

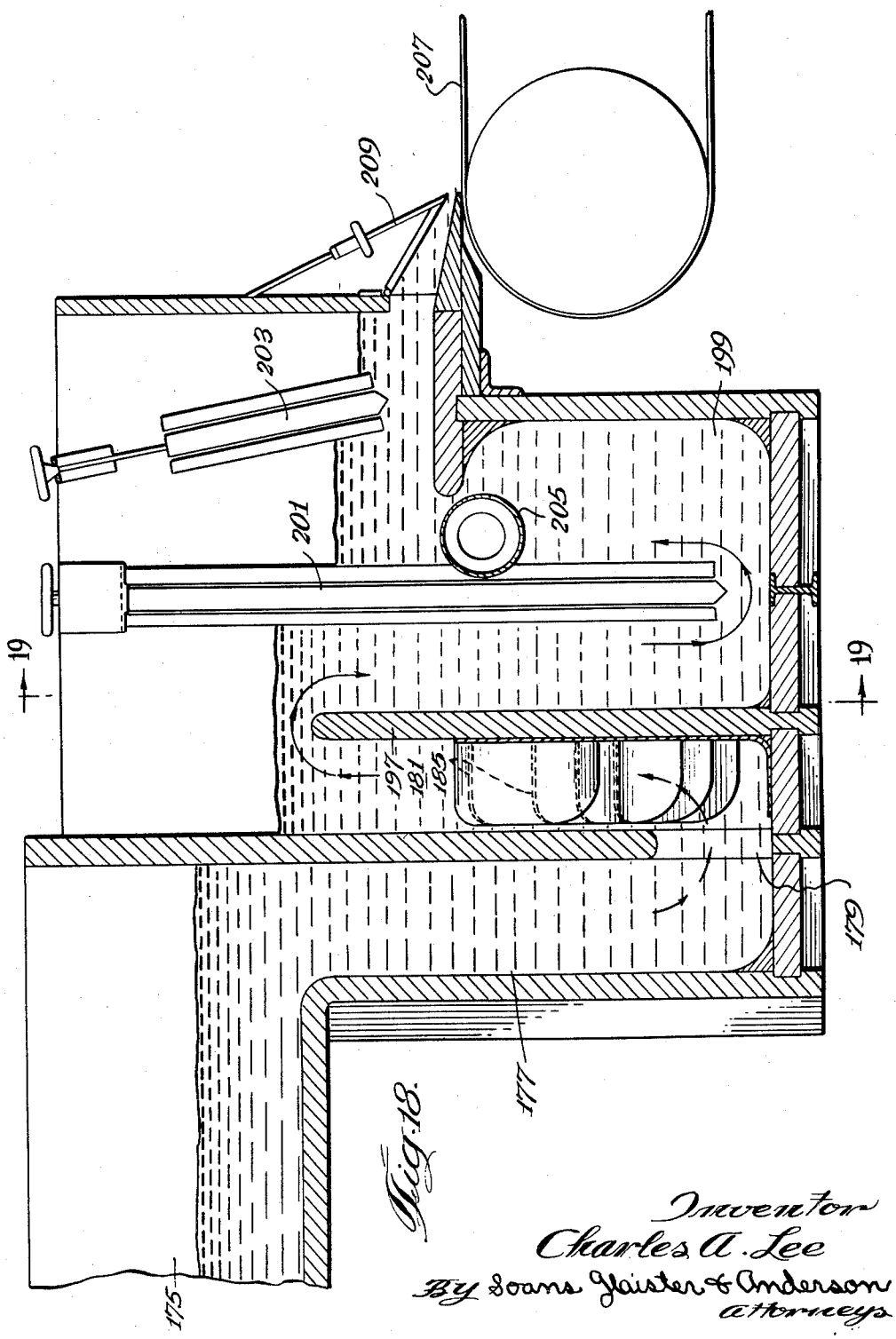

Dec. 23, 1958 C. A. LEE 2,865,260
FLOW CONTROL APPARATUS
Filed Sept. 22, 1953 11 Sheets-Sheet 10
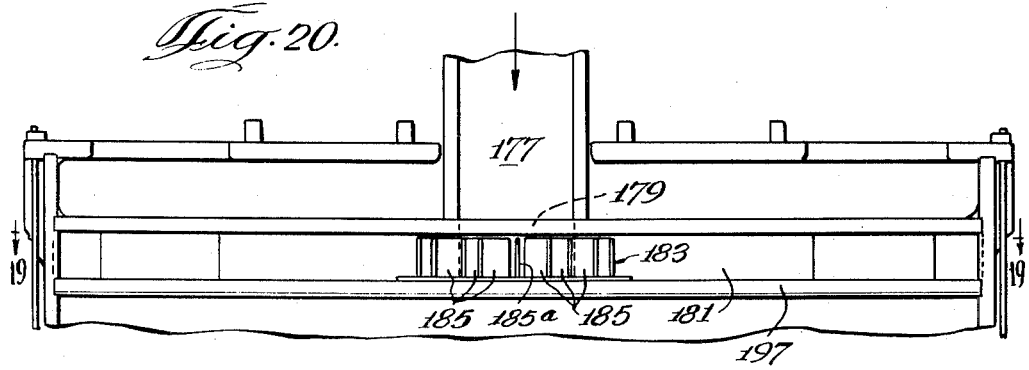
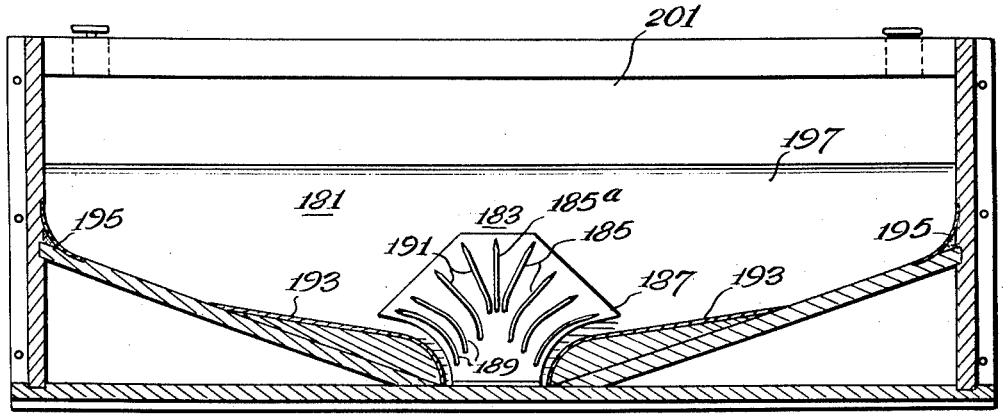
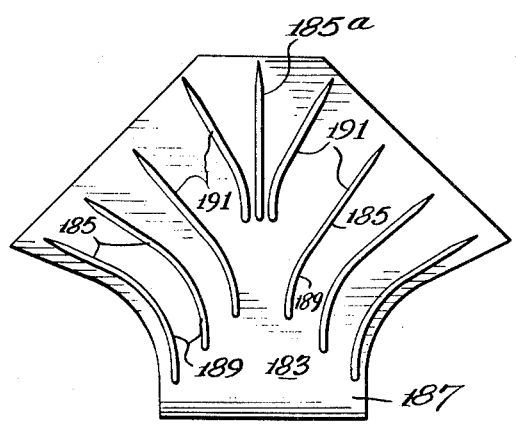
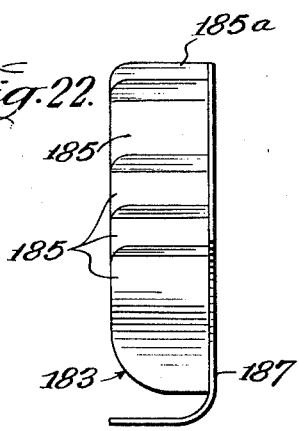
Inventor
Charles A. Lee
By Soans, Glaister & Anderson
Attorneys Dec. 23, 1958    C. A. LEE    2,865,260
FLOW CONTROL APPARATUS
Filed Sept. 22, 1953    11 Sheets-Sheet 11
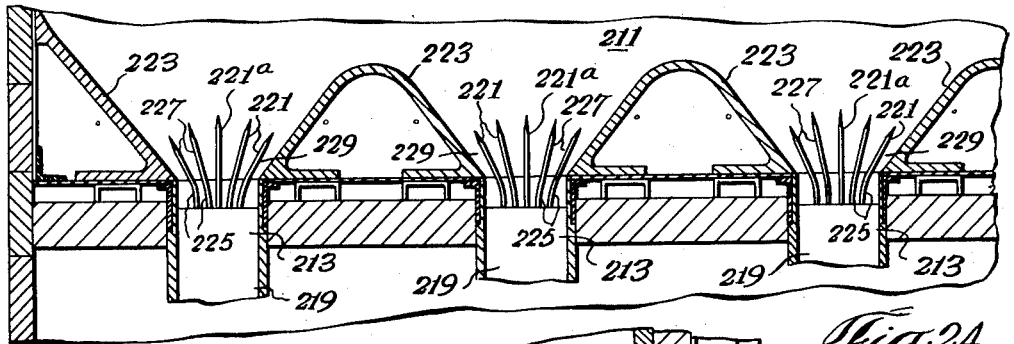
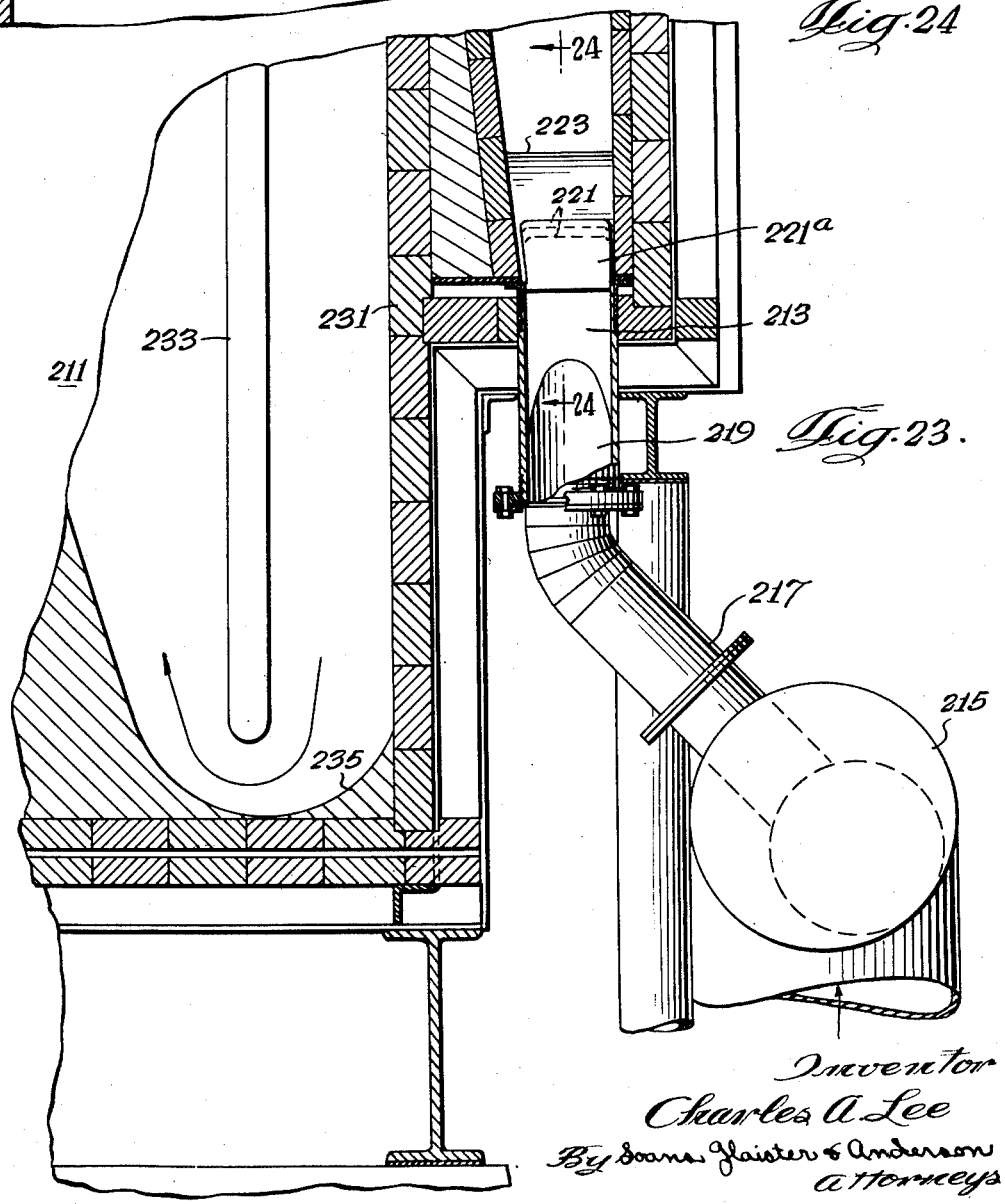
Inventor
Charles A. Lee
By Soans, Glaister & Anderson
attorneys United States Patent Office 2,865,260
Patented Dec. 23, 1958

2,865,260

FLOW CONTROL APPARATUS

Charles A. Lee, Neenah, Wis., assignor, by mesne assignments, to Kimberly-Clark Corporation, a corporation of Delaware Application September 22, 1953, Serial No. 381,619

19 Claims. (Cl. 92—44)

The present invention relates generally to the art of web forming, and more particularly, to the control of flowing streams of liquids and gases in web-forming equipment, which streams may have fibers and other materials suspended or dipersed therein. Generally stated, the principal object of the invention is to provide improved flow control means for web-forming equipment.

The control of flowing streams of liquids and gases, and especially flowing streams of liquids and gases which contain fibers and other suspensions or dispersions, is of great importance in the web-forming art. For example, in the operation of Fourdrinier type papermaking machines, it is necessary to deliver the fiber-containing liquid stock from which the paper is manufactured to the web-forming region of the machine in the form of a wide, and relatively shallow, flowing stream of rectangular cross-section, which may be under considerable pressure.

In Fourdrinier type papermaking machines, it is necessary, for economic reasons, to collect and re-use the white water (i. e., the liquid which passes through the Fourdrinier wire), the white water being mixed with additional pulp or stock before being returned to the web-forming region. The practical method of accomplishing this operation is by the use of a suitable pump, normally designated as the fan pump, in conjunction with a closed conduit system. It thus becomes necessary in the stock conduit system to transform the confined stream of liquid discharged by the fan pump, which is usually circular in outline, into the shallow, relatively wide stream which is required at the web-forming region, and the portion (or portions) of the stock conduit system which accomplishes this transformation is conventionally termed a "flow spreader."

Moreover, in order to produce a paper sheet having uniform physical properties, the paper stock (which includes water, pulp, fiber, filler, dye, glue, etc.) delivered to the web-forming region of the machine should be evenly distributed across the machine width. Expressed mathematically, this means that the kinetic energy and fluid pressure in the unit areas of the stream delivered to the web-forming region should be as uniform as possible throughout the stream cross-section, and in addition, the entire stream should be maintained in a condition which is as near to steady-state flow as it is possible to obtain. In other words, the stock should be delivered to the web-forming region at a uniform pressure and velocity across the width of the machine, and the pressure and velocity relationship should be invariant with time.

Similarly, in the operation of certain forms of air-forming equipment, it is necessary to deliver one or more wide and relatively narrow flowing streams of air to the web-forming chamber of the equipment for guiding or focusing a stream of separated fibers within the forming chamber to the surface of a moving wire. The air which is directed into the forming chamber passes through the moving wire and is generally collected and recirculated through the system. This is usually accomplished by means of a suitable suction fan or blower in conjunction with a closed conduit system. As in the case of the conduit system of a Fourdrinier papermaking machine, the conduit system of such air-forming equipment requires at least one flow spreader, that is, a conduit section which transforms the confined stream of air discharged by the blower into the shallow, relatively wide stream which is required at the web-forming chamber.

Also, as in the case of a stream of stock which is delivered to the web-forming region of a Fourdrinier papermaking machine, in order to produce a web having uniform physical properties, each of the air streams should be delivered to the forming chamber of the air-forming equipment at a uniform pressure and velocity across the width of the stream, and the pressure and velocity relationship should be invariant with time.

The desirability of obtaining the uniform pressure steady-state flow conditions described above during the operation of web-forming equipment is well recognized in the web-forming art, and various flow spreaders and other flow control arrangements have been suggested and used in an effort to attain these condition. These arrangements have not, however, been completely satisfactory, even when the flowing stream discharged from the fan pump or blower is changed in very gradual stages, from its initial and usually circular form to the shallow, elongated, rectangularly-shaped form required in the web-forming region, although such arrangements have proven somewhat more satisfactory than most of the other flow-spreading devices previously suggested in the art.

A second and more specific object of the invention, therefore, is to provide improved flow control means for the flow-spreading stock conduit systems of web-forming equipment.

As will hereinafter appear, the above stated objects of the invention are accomplished by the provision of suitably dimensioned flow-spreading conduit systems which utilize guide vanes of certain particular types, or shafts disposed in certain particular arrangements and locations. The invention makes possible much more positive and much more effective control of the flowing streams of liquids and gases encountered in web-forming equipment than has heretofore been attained, and in addition, this improved flow control is accomplished in relatively short distances of flow. Thus, in addition to providing improved control of flow spreading in web-forming equipment, the invention makes possible a material decrease of the physical dimensions and a reduction in cost of the web-forming equipment wherein it is used.

In the drawings, wherein are illustrated certain embodiments of the invention:

Figure 1 is a plan view, partially in section, of a portion of the flow conduit system of one form of web-forming equipment embodying certain of the features of the present invention;

Figure 2 is an enlarged perspective view of one of the guide vanes provided in the structure of Figure 1;

Figure 3 is a vertical sectional view on the general line 3—3 of Figure 1;

Figure 4 is an enlarged fragmentary plan view of the dial plate assembly provided in the structure of Figures 1–3;

Figure 5 is a fragmentary sectional view taken on the general line 5—5 of Figure 4;

Figure 6 is a fragmentary sectional view taken on the general line 6—6 of Figure 4;

Figure 7 is a fragmentary plan view of the gear mechanism provided for rotating the guide vanes in the structure of Figures 1–6;

Figure 8 is a fragmentary sectional view taken on the general line 8—8 of Figure 7;

Figure 12 is a plan view, partially in section, similar to Figure 1, illustrating other features of the invention;

Figures 13 and 14 are graphs similar to Figures 10 and 11, illustrating certain of the hydraulic characteristics of the flow conduit illustrated in Figure 12;

Figure 15 is a plan view, partially in section, similar to Figures 1 and 12, illustrating still another flow conduit embodying flow control means in accordance with the present invention;

Figure 16 is a sectional view on the general line 16—16 of Figure 15;

Figure 17 is a diagrammatic elevational view, partially in section, of the web-forming and inlet end of a high-speed, pressure-inlet type Fourdrinier papermaking machine, which is provided with flow spreading means in the stock conduit system in accordance with the principles of the present invention;

Figure 18 is a cross-sectional view of the web-forming region of a head box type papermaking machine provided with flow spreading and flow control means in accordance with the invention;

Figure 19 is a sectional view on the general line 19—19 of Figure 18;

Figure 20 is a plan view of the structure illustrated in Figure 19;

Figure 9:
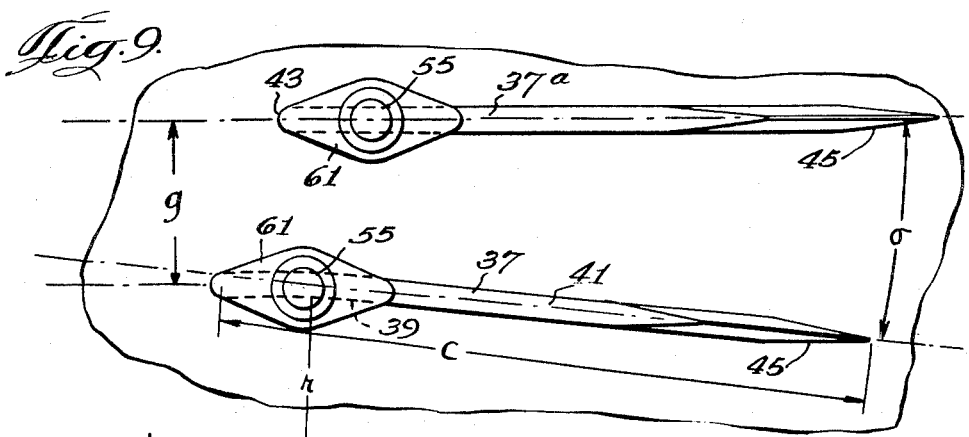
Figure 9 is an enlarged, fragmentary, plan view of two of the guide vanes provided in the structure of Figures 1–8.

Figures 21 and 22, respectively, are enlarged front and side elevational views of the flow control means embodied in the head box structure illustrated in Figures 18 and 19;

Figure 23 is a sectional view similar to Figure 18 of another head box type machine, utilizing a branched inlet conduit for the stock. Flow control means in accordance with the invention are embodied in each of the branched inflow conduits of this machine;

Figure 24 is a fragmentary sectional view on the general line 24—24 of Figure 23; and Figure 25 is a diagrammatic elevational view, partially in section, of air-forming equipment having air inflow conduits which are directed into the web-forming region. Flow control means in accordance with the invention are embodied in each of the air inflow conduits of this equipment.

This application is a continuation-in-part of my prior application Serial No. 119,140, filed on October 1, 1949, now Patent No. 2,684,690, issued July 27, 1954.

As previously stated, the flow control means of the present invention have particular relation to the control of flowing streams of fluids within the conduit systems of web-forming equipment, and more specifically, within flow spreaders which are used for transforming a flowing stream of liquid or gas discharged from a fan pump or blower into the shallow, elongated, rectangularly-shaped form required in the web-forming region of web-forming equipment. It will be understood that the particular structures illustrated in the drawings are merely illustrative embodiments of the general principles involved.

Flow spreaders as used in the conduit systems of web-forming equipment comprise, essentially, rigid-walled conduits adapted to be connected into the stock conduit system between the fan pump or blower and the web-forming region of the equipment for the purpose of effecting the required widening and narrowing of the flowing stream entering the web-forming region of the equipment. The conduit section (or sections) between the fan pump or blower and the throat or inflow end of the flow spreader is suitably dimensioned and shaped so as to establish the flowing stream of fluid in a substantially steady-state flow condition as it enters the flow spreader. In addition, the conduit section (or sections) between the outflow end of the flow spreader and the forming region of the web-forming equipment is suitably dimensioned and shaped so as to maintain the fluid which flows outwardly from the flow spreader in a steady-state condition until it enters the web-forming region of the equipment. Flow spreaders in accordance with the present invention are provided with a plurality of guide vanes or shafts disposed adjacent the inflow end thereof, and possibly elsewhere along the flow path. These vanes or shafts are so shaped and so positioned with reference to the dimensions of the flow spreader, that the fluid is delivered to the outflow end of the flow spreader under substantially uniform pressure across the width of the flow spreader and with substantially uniform velocity throughout the cross-sectional area in that region.

A flow spreader embodying a particularly desirable form and arrangement of guide vanes in accordance with the present invention is illustrated in Figure 1, in which figure an inflow conduit 31 is shown connected to a rigid-walled, laterally diverging conduit section, or flow spreader 33. The flow spreader 33 connects with a straight-sided outflow section 35, which leads to the web-forming region of web-forming equipment. Conveniently, the opening at the inflow end of the flow spreader 33 is rectangular in outline, and it may be square. The opening at the outflow end of the flow spreader is likewise of rectangular outline. However, it is wider and may be of lesser or greater depth than the inflow opening. As previously stated, the inflow conduit 31 should be of such dimensions that a flow condition which at least approximates steady-state flow is attained at the inflow end of the flow spreader.

A plurality of longitudinally extending vane units 37, formed of suitable material such as stainless steel, are positioned adjacent the throat or inflow end of the flow spreader unit within a removable section thereof, and as shown particularly in Figure 9, each of the vanes except the central or base vane 37a, includes a curved or arcuate section 39 at the up-stream end which is tangent to and merges with a flat section 41 at the down-stream end. The curved sections 39 of the vanes are sections of vertical, right cylinders of circular cross section, and the faces of the flat sections 41 are coincident with vertical planes. This is illustrated in the enlarged plan view of Figure 9. The central vane or vanes 37a may be straight. As illustrated, the degree of curvature of the arcuate sections 39 of the vanes near the outer edges of the flow spreader is less than the degree of curvature of the arcuate sections 39 of the inner vanes.

As will hereinafter appear in greater detail, the vanes constitute control elements which control and adjust the pressure and velocity relationship existing in the flowing stream passing through the flow spreader. Hence, the vanes should be of such shape or character that they react dynamically with the stream, i. e., a condition of dynamic lift is realized. Hence, curved sections other than sections of circular cross-section right cylinders can be used in the curved sections of the guide vanes in accordance with the invention. For example, right sections of cylindrical surfaces generated along curves other than a circle; for example, conic curves such as parabolas or hyperbolas can be used, as can spiral functions and other curves. In general, the shape of the curved section becomes increasingly critical as the flow velocity increases.

It is also possible, at least in certain cases, to obtain sufficient dynamic lift to control and adjust the pressure and velocity relationships in the flowing stream with guide vanes (not shown) which have straight sections at their up-stream ends as well as straight sections at their down-stream ends, with the straight up-stream section of each vane arranged at an angle with respect to its down-stream section and connected thereto through a relatively short curved section.

In order to obtain the most favorable flow characteristics around the vanes 37 and 37a, the leading edges of the vanes are slightly rounded and the trailing end portions of the vanes are tapered as indicated at 43 and 45 in Figure 9. In addition, the forward or leading edge 47 of each vane slopes downwardly and rearwardly and merges smoothly through a curved edge portion 49 with the lower edge 51 of the vane, thus assuming at least an approximation of a hydrofoil outline. The rearward edge 53 of each vane is generally parallel to the leading edge 47 of the vane (Figure 3).

In order to facilitate the accomplishing of the objects of the invention, each of the vanes 37 and 37a is supported by a suitable spindle 55 so as to be rotatable about an axis which is in the plane of and in a direction approximately normal to the longitudinal axis of the vane. As shown in the drawings, the spindles 55 are located adjacent the forward or leading ends of the vanes 37 and 37a which permits the trailing ends of the vanes to be shifted laterally with respect to each other while the spacing between the leading ends of the vanes remains approximately constant. The spindles 55 are journalled within spaced passageways 57 in the upper wall of a removable section 59 of the flow spreader 33. Each of the guide vanes 37 and 37a includes a laterally-extending, generally elongated, diamond-shaped boss or plate 61 which extends slightly above and connects with the forward or leading end of the upper edge 63 of the guide vane. The diamond-shaped bosses 61 extend to and merge smoothly with the forward edges 47 of the guide vanes 37 and 37a, and also connect approximately centrally with the supporting spindles 55. The lower surfaces of the diamond-shaped bosses are beveled upwardly in a direction outwardly from its longitudinal axis as indicated at 65 in Figure 3, thereby forming a streamline construction. The guide vanes 37 and 37a are generally biased upwardly, causing the upper surfaces of the diamond-shaped bosses 61 to seat against the upper wall of the removable section 59 of the flow spreader 33. When the guide vanes 37 and 37a are located in a flow spreader section which decreases in depth along the direction of flow therethrough, as in the illustrated structure, the upper surfaces of the diamond-shaped bosses 61 may be appropriately beveled to make it somewhat easier to rotate the vanes around the axes of the spindles 55. Guide vanes 37 and 37a which are constructed in the above described manner provide a minimum resistance to the flow of fluid therealong, and additionally minimize any tendency toward the accumulation of fibers or other materials which may be carried by the fluid stream. Since the leading edges 47 of the guide vanes slope away in the direction of fluid flow, fibers or other material which strike the forward edges of the guide vanes slide downwardly therealong and continue to be carried along by the fluid stream.

The spindles 55 extend upwardly through suitable apertures 67 in a V-shaped seal plate 69 which is positioned on the upper wall of the removable section 59 of the flow spreader 33. Suitable O ring packing seals 71 are provided in recesses 73 at the base of the apertures 67 in order to prevent fluid from escaping through the passageways 57. A flexible spring washer 75 is located around each spindle 55 and is supported on the seal plate 69. The spring washers 75 are maintained in compressed position around the spindles alternately by set collars 77 which are attached to their associated spindles by set screws 79 and by gears 81 which are attached to their associated spindles by pins 83. The spring washers 75 resiliently bias the vanes 37 and 37a in an upward direction, drawing the upper surfaces of the diamond-shaped plates 61 toward the upper wall of the flow spreader 33. A gear sector 85 is attached to the central spindle 37a by a pin 87 at a point spaced upwardly from the gears 81 which are on adjoining spindles, and a gear 89 is similarly attached by a pin 91 to each of the remaining spindles which have set collars 77 immediately above the spring washers 75 at points spaced upwardly from the gears 81 which are on adjoining spindles. The staggered arrangement of gears on adjoining spindles permits the guide vanes 37 and 37a to be set closer to one another than would otherwise be possible.

Each of the gears 81, 85, and 89 are operatively connected to a separate worm 93. The worms 93 are mounted on shafts 95 and 97 which are journalled within suitable brackets 99, 101, and 103 mounted on the upper wall of the flow spreader 33. Each worm 93 is integrally connected to a collar 105 which has a series of circumferentially-spaced recesses 107 which are adapted for cooperative engagement with a suitable wrench (not shown) for rotating the worm. Suitable dial plates 109 and vernier indicators 111 are provided for indicating the positions of the guide vanes 37 and 37a. The dial plates 109 are attached to set collars 113 by screws 115, and the set collars are adjustably connected to the top of the spindles 55 by set screws 117. The vernier indicators 111 are attached to a support plate 119 which is connected to the brackets 103.

When the guide vanes 37 and 37a are adjusted to the desired position, they may be locked in position by lock pins 123 located in suitable passageways 125 which extend horizontally within the upper wall of the removable section 59 of the flow spreader 33. Suitable gaskets 127 are provided for preventing the escape of fluid through the passageway 125.

The vanes 37 and 37a are disposed with their axes of rotation in spaced, parallel relationship, and the dimensions of the vanes are such that the lower and upper edge surfaces 51 and 63 thereof clear freely the upper and lower defining walls of the flow spreader 33. When used for the control of flowing streams of liquids containing fibrous suspensions or dispersions, such as the liquid stock normally used in papermaking, the clearance between the vane edges and the adjacent walls of the flow spreader may desirably be within the range of from about one-fourth to one inch. The vanes should, however, be of such width that at least 80 percent of the depth of the flowing stream is subjected to flow control by vane action. In air-forming equipment, somewhat less clearance can be used.

The vanes 37 and 37a divide the throat or inflow end of the flow spreader into a plurality of segmental sections as shown particularly in Figures 1 and 9. In the illustrated structure, the vanes are symmetrically arranged and divide the throat of the flow spreader into substantially equal angular segments, each of which encompasses a divergence angle $\sigma$. When this vane arrangement is used, the divergence angle $\sigma$ between adjoining vanes should not exceed 15°, and for best results, this angle should be within the range of from approximately 3 to 6°. The flat, trailing section 41 of each vane is normally disposed in a plane which is coincident with the segmental division lines as illustrated.

It follows that, in order to determine the number of vanes which will be required in a particular flow spreader, the total effective angle of divergence of the flow spreader, expressed in degrees, when divided by 15 will give the minimum possible number of segmental divisions of the flowing stream. The total divergence angle of the flow spreader is the angle subtended by straight lines joining the extreme side edges of the inflow and outflow openings of the flow spreader, as illustrated at $\alpha$ in Figure 1. In this connection, it should be noted that the number of segmental areas is one greater than the number of vanes. Thus, the minimum number of vanes N is equal to $$\frac{\alpha \text{ (in degrees)}}{15} - 1$$

The total angle of divergence in a flow spreader unit used in web-forming equipment and employing flow control vanes in accordance with the invention may reach a maximum of 180°, although it will generally be found desirable to restrict the maximum total angle of divergence to from about 80 to 120°.

The effectiveness of the vanes in accomplishing flow control in web-forming equipment is necessarily dependent upon the velocity of the flowing stream in the region in which the vanes are located. In general, the flow velocity must be sufficient to develop circulation or "lift" at the vane surfaces and for vanes of the type disclosed in the present application, this means that the vanes must be located in regions where the flow velocity is at least approximately one-half foot per second for liquids, and is at least approximately one-fourth foot per second for air or other gases. The preferred operating range for both liquids and gases is from about 5 to 10 feet per second in the vane region.

The lifting force on the guide vanes arises from the fact that the guide vanes are curved, thus producing an ever increasing angularity to the relative normal motion of the fluid. The magnitude of the force will depend upon the angle of inclination of the vane member to the normal direction of flow; which in turn is then given an angular component of momentum of the same order of magnitude as the angular relationship of vane to the normal stream flow. Unless lift is developed on the vane, there cannot be sufficient momentum imparted to the fluid to divert it from its normal path; and consequently, there can be no control of pressure and velocity across the flow spreader at its outlet. Furthermore, eddying and separation of flow will occur in the flow spreader proper under conditions of no lift on the guide vanes due to their inability to deflect the flow properly under conditions of no lift.

Since the maximum flow velocities are usually found at the inflow end or throat section of the flow spreader, it will usually be found advantageous to locate the vanes in this region, although the vanes can be placed down-stream of the inflow end of the flow spreader, provided that the flow velocity in the selected region is adequate. Location of the flow control vanes in the throat section of the flow spreader has, however, certain other advantages. Particularly, the increased velocity existing in this region assures maximum scouring of the vanes during the operation of the flow spreader, this being of particular importance in systems containing fiber dispersions. Although scouring of the vanes is not essential with the above described vane construction since the vanes are particularly designed for preventing the accumulation of fiber therealong, it should be understood that other forms of guide vanes could be used, and in such cases, the scouring action provided by the force of the flowing stream would be of greater importance. Examples of other forms of vane constructions may be seen in my prior application, Serial No. 119,140, now Patent No. 2,684,690. Also, it is advantageous to effect the desired correction of the pressure and velocity conditions within the flowing stream as soon as possible along the flow spreader, flow control in this manner favoring the obtaining of steady-state flow within the flow spreader.

The dimensioning of the individual guide vanes located in the throat of the flow spreader is another feature of importance in assuring the development of adequate reaction force or "lift" at the vane surfaces. Generally, the vane dimensions should be such that the gap to chord ratio, i. e., the ratio of the segmental distance between the parallel leading edges of adjacent vanes (the dimension $g$ of Figure 9) and the chord of each vane (the dimension $c$ of Figure 9) should be within the range of from 1:2 to 1:4.

The use of a series of symmetrically-spaced flow control vanes as outlined in the foregoing will effect quite remarkable improvement in the pressure and velocity relationships existing at the outflow end of the flow spreader, as compared with the prior structures wherein vanes are not used. For example, in Figure 10, the curve labeled I is illustrative of the variation in the velocity of the flowing stream which is normally encountered across a transverse or across-the-machine section of a flow spreader, such as that illustrated at 33, in the absence of control vanes as described. The variation in the transverse velocity in this graph is expressed as the percent of the velocity (V) existing at any given point across the outflow end of the flow spreader when divided by the average velocity ($V_{av}$) over the entire outflow area of the flow spreader. It will be noted that the velocity variation may exceed 20 percent with reference to the average velocity, and that the total velocity variation in the stream may be in excess of 40 percent of the average velocity. Variations of this magnitude, which are commonly encountered in web-forming equipment, are believed to be largely responsible for the difficulties experienced in the web-forming region of such equipment.

Figure 10:
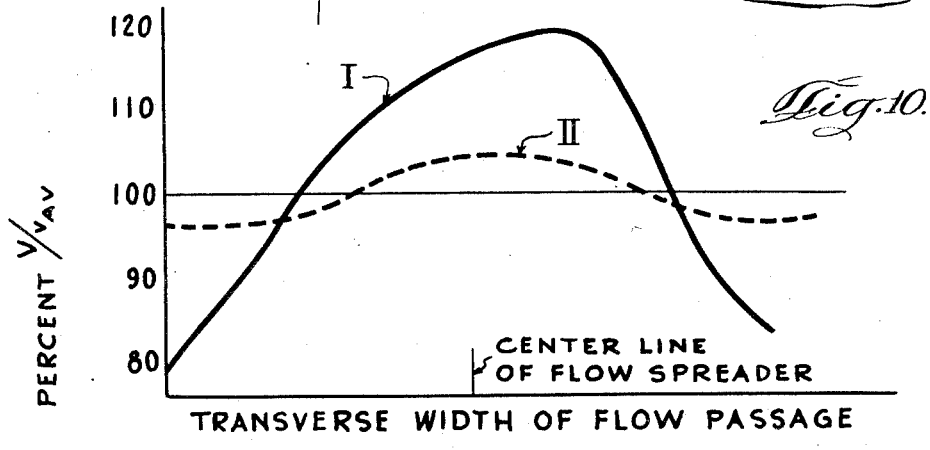
Figures 10 and 11 are graphs illustrating certain of the hydraulic characteristics of the flow conduit structures shown in the preceding figures of the drawings.
Figure 11:
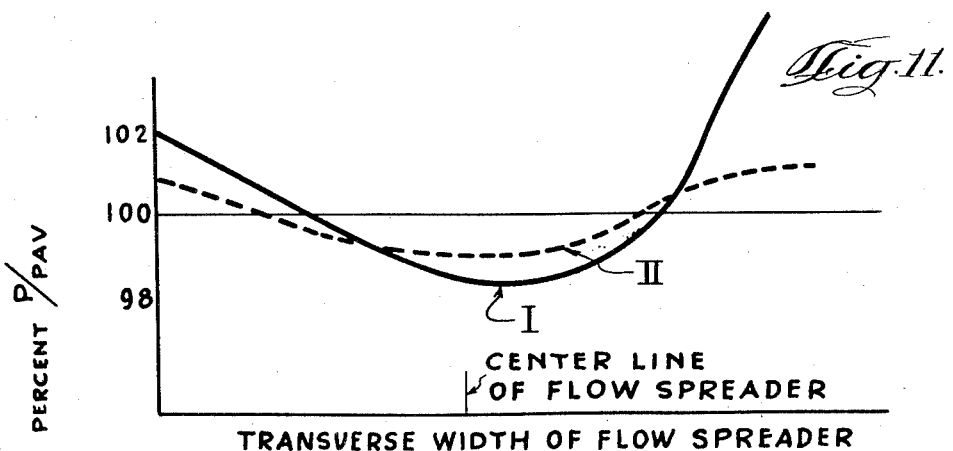

In Figure 11, there is a similar curve, labeled I, which is representative of the variation in pressure transversely across the outflow opening. The variation here bears the expected relation to the velocity relation, although the actual magnitude of the variation expressed percentagewise is somewhat less. The curves labeled II in Figures 10 and 11 show the effect of the guide vanes 37 and 37a, and it will be evident that a remarkable improvement in the flow characteristics at the outflow end of the spreader has been accomplished by the addition of the vanes.

In the exemplified embodiment of the invention described in the foregoing, the flow control vanes 37 and 37a have been arranged symmetrically with respect to the central axis of the flow spreader. This arrangement will usually be found to be quite satisfactory for accomplishing the objects of the invention, provided that the velocity distribution in the flowing stream is reasonably symmetrical in the two halves of the flow spreader, since by relatively minor adjustment of the vanes, it becomes possible to attain substantially equal volumetric discharge of fluid in each segmental section. In some flow conduit systems of web-forming equipment, however, the flowing stream which is delivered to the inflow end of the flow spreader may, for one reason or another, exhibit less uniform velocity distribution. For example, in paper-making machines where the fan pump is located in close proximity to the inflow end of the flow spreader, one-sided or asymmetric velocity and pressure relationships may be found in the flowing stream obtained in the stock conduit. When a stream of this character passes through a flow spreader, the uneven pressure and velocity distribution at the inflow end will tend to carry through to the outflow end with uneven volumetric discharge from the segmental sections with the possibility that transient or sustained oscillatory conditions may be set up in the stream passing from the flow spreader. The velocity and pressure relationships in a stream of this character are illustrated in the graphs, Figures 13 and 14, which are generally similar to Figures 10 and 11, and wherein the curve labeled 1 illustrates the velocity and pressure distribution across the outflow side of the flow spreader under the above described conditions.

In instances of this type, it will be found desirable to use control vane arrangements which are asymmetrically disposed with relation to the central axis of the flow spreader. Such an arrangement is illustrated in Figure 12. In this construction, the flowing stream passing through the flow spreader 129 is divided by a plurality of control vanes 131 and 131a (which may be similar to the vanes 37 and 37a) into segmental sections, each of which includes a divergence angle $\sigma$ of not more than 15° (and preferably within the range of 3 to 6°) as previously described. However, in this construction, the straight or base control vane 131a is located as near as possible to the center of the maximum velocity region in the flowing stream admitted to the throat of the flow spreader 129, and the outer vanes 131 (which include curved up-stream sections 133) are disposed at either side of the base vane 131a. As in the previously described embodiment, the curved sections 133 of the vanes constitute sections of right cylinders and the degree of curvature increases in the individual vanes outwardly from the base vane.

The curves labeled II in Figures 13 and 14 illustrate the uniforming of the velocity and pressure relationships across the transverse width of the flow spreader which are effected by the use of asymmetrically-located control vanes 131 as above described. It will be seen that the arrangement makes possible a very effective evening-out of the flow with the additional advantage of minimizing the possibility of pulsations or other undesirable transient conditions.

It will be noted that the inner surfaces of the side walls of the several flow spreading units described in the foregoing are curved at the juncture of the inflow and flow spreading sections thereof, and at the juncture of the outflow and flow spreading sections thereof, as shown particularly at 135 and 135a in Figure 1. The surface curvatures of the side walls desirably follow the stream lines of the flow in these regions and are of considerable value in attaining uniform steady-state flow at and forward of the outlet of the flow spreader.

In the previously described structures, the vane arrangement is on a geometric basis, i. e., the flow path is divided into a plurality of flow segments having equal divergence angles. For best results, the volumetric discharge from the several segments produced by the control vanes should be substantially equal, and this condition is generally obtained by the described geometric spacing of the vanes, provided that the velocity pattern is not too irregular or too one-sided.

However, the vane arrangement may be based on an actual measured division of the flow path into segments of equal flow, and where particularly accurate control is desired, this division may be preferred. The determination of the boundaries of the equal flow segments can be conveniently determined by a velocity transverse of the area of the flow path. The number of segments N remains the same regardless of whether equal angle or equal flow volume segments are used, i. e., the minimum number of segments N is equal to $$\frac{\alpha \text{ (in degrees)}}{A} - 1$$

where A is not more than 15, and is preferably within the range of 3 to 6.

The control vane arrangement used in the previously described embodiments of the invention are, except for the base vane which is preferably flat, curved in one direction only, i. e., all of the vanes have a curved leading section, the surfaces of which are tangent to and merge with the surfaces of the flat-surfaced trailing section. Also, the surfaces of the curved sections of the disclosed structures are coincident with the surfaces of vertically disposed, right cylinders of circular cross-section. All of the disclosed vanes are essentially of uniform thickness except for the slight rounding of the leading edges and the tapering of the trailing edges. With vanes of this type, it is possible to achieve a very high degree of control of flowing streams of liquids and gases in web-forming equipment, which streams may contain fibrous suspensions or dispersions; as for example, the stream of stock passing through the flow spreader of a papermaking machine.

In certain instances, improvement of the flow pattern through the flow spreader of web-forming equipment to the extent accomplished by the vane arrangements illustrated in Figures 1 and 12 is not sufficient, and it is possible to materially increase the effectiveness of the control by adding to the basic control vane structures illustrated in Figures 1 and 12, auxiliary vanes (not shown) located in the outer segmental flow sections. Such auxiliary vanes make possible increased control of the stream, especially in the outer edge regions where frictional losses are at a maximum and where an increased degree of control has been found to be particularly advantageous.

The auxiliary vanes may be constructed similar to the vanes which have been previously described. The angular positioning of the auxiliary vanes is best determined on the basis of actual operation of the flow spreader. A flow spreader embodying control vanes together with auxiliary vanes is illustrated and discussed in my prior application, Serial No. 119,140, now Patent No. 2,684,690.

The principles of flow control herein discussed are not limited to the use of vanes which are curved in only one direction, or to vanes which are of generally uniform thickness, and in instances where added refinement of control is desired, multiple curved vanes (not shown) and vanes of special cross-sectional outline (not shown) may be used. For example, the vanes may be similar to those shown in Figure 9 with the added provision that the generally flat-surfaced trailing sections are twisted or skewed relative to the leading sections of the vanes. The resultant vanes will then have flow control surfaces in both the horizontal and the vertical plane; i. e., the vanes are curved in two directions. An example of a flow spreader employing vanes which are curved in two directions and which are of non-uniform thickness is illustrated and described in my prior application, Serial No. 119,140, now Patent No. 2,684,690.

The double curvature of the vanes makes possible considerable refinement in the control accomplished by the vanes. Particularly, the double curved arrangement of the vane surfaces, by imparting a slight twisting action to the stream acted upon by each vane, effects substantial erasure of the wake which is produced down-stream of that vane in a very short distance of flow. Important improvement in the stability and steadiness of flow thereby results.

A flow spreader embodying another flow control mechanism in accordance with the general principles of the present invention is illustrated in Figures 15 and 16. This structure includes an inflow conduit 137 of rectangular or square cross-section, a flow spreading section 139, and an outflow section 141, conveniently fabricated of plate sections, and it employs flow control means which consist of a plurality of independently driven, generally symmetrically-arranged, rotatable rods or shaft-units 143 of circular cross-section. These shaft units, as illustrated in the drawings, are located so as to define segmental flow sections in the flow path through the flow spreader similar to the vane structure previously described, except that there is no control unit on the center line of the flow spreader. In this connection, it will be understood that the flat control vane can be omitted under very favorable flow conditions, and that, in general, the vanes and rotating shafts are comparable flow control mechanisms.

Each of the segmental sections into which the flow spreader is divided for the purpose of locating the flow control shaft-units 143 should include a divergence angle of not more than 15°, and preferably should include an angle within the range of from 3 to 6°. Such a division is illustrated in Figure 15 where the total divergence angle is indicated by the angle α and the segmental sections by the angles σ. The shaft-units have polished surfaces and have diameters which are desirably within the range of from about one-tenth to one-fourth of the transverse width of the segmental sections at the region in which they are located. The shaft-units 143 may be located centrally of segmental sections of equal flow per unit of time as in the previously described structure.

Each of the flow control shaft-units 143 is arranged to be independently driven at selected speed by means of independent, variable-speed motor drives 145. The shaft-units 143 in the opposite halves of the flow spreader are driven in opposite directions as indicated by the arrows in Figure 15, unless the velocity and pressure relationships of the inflow stream are asymmetrical. In such instances, the rotation of the rods is arranged to reverse on either side of the center of the flow pattern. The shaft-units 143 should be driven at a relatively high speed in order to minimize the possibility of wake formation.

Generally, the speed of rotation of the shaft-units 143 should be sufficient to produce peripheral speeds at the surface of the units which are at least four times the flow velocity in the region of those units.

For most satisfactory results, the cross-sectional area of the flow spreader in accordance with the invention should increase gradually in the direction of flow through the flow spreader. If the cross-sectional area of that portion of the supply conduit immediately preceding the guide vanes or shaft-units exceeds the cross-sectional area of adjacent up-stream portions of the supply conduit, difficulty in maintaining the flow pattern will be observed. It is permissible, however, to decrease gradually the cross-sectional area of the supply conduit in the region immediately preceding the flow spreader, and in some instances, this may be found desirable. Also, in some instances, a perforated baffle plate or equivalent flow-evening unit may be placed adjacent the inflow or outflow end of the flow spreader, or adjacent both ends with advantageous results.

An example of a papermaking stock supply conduit system having embodied therein a flow spreading section or unit in accordance with the present invention is illustrated somewhat diagrammatically in Figure 17. In this figure, the stock or fan pump by which the stock is delivered to the web-forming region of the machine is illustrated at 147. The pump 147 has a circular discharge outlet, and the system includes a transition section 149, which changes the shape of the flowing stream discharged by the pump from a circular outline to a square outline. The transition section 149 connects the outflow side of the pump 147 to the inflow end of a flow spreader unit 151. The transition section 149 is suitably proportioned and dimensioned so that the flowing stream is in a steady-state flow condition when it reaches the entrance to the flow spreader unit 151.

The flow spreading and control unit 151 diagrammatically illustrated in Figure 17 desirably includes control vanes similar to that illustrated in Figures 1 through 9.

More particularly, the flow spreader unit 151 constitutes, in effect, the initial portion of a much larger flow spreader 153 which includes an initial horizontal section 155, an elbow section 157, and a vertical section 159. The flow passageway 161 through the flow spreader 153 is rectangular in cross-section, and it increases uniformly in width until it reaches the full width of the machine at the inflow side of the machine inlet 163. The cross-sectional area of the flow passageway 161 increases gradually in the direction of flow, the area of the outflow opening at the point where the passageway 161 connects with the passageway 165 in the inlet 163 being, in the illustrated structure, about 300 percent of the area of the inflow opening of the unit 153. The inlet flow passageway 165 is of generally uniform cross-section and this passageway maintains the stream of stock in a substantially uniform and steady-state flow condition to the web-forming region of the machine, in which region the stock is discharged against and in part through the Fourdrinier wire illustrated at 167. The wire 167 is supported by the usual breast roll 169, so as to extend across the outflow end of the inlet, and the apparatus includes a slice 171 of known type for confining the flowing stream of liquid delivered by the inlet 163 to the web-forming region. The breast roll 169 may be of conventional structure, or otherwise, and the usual suction boxes 173 or other means will be provided for aiding in effecting drainage of water through the wire during the web-forming operation.

As previously indicated, the cross-sectional area of stock conduit systems embodying the flow spreading and flow controlling means of the present invention desirably gradually increases axially along a portion of the path of flow of the stock. It is possible, however, to operate a stock supply system such as that illustrated in Figure 17 with a flow conduit of substantially uniform cross-sectional area, or even of gradually decreasing cross-sectional area along a portion of its length.

The provision of flow control means in accordance with the invention immediately following the fan pump as shown in Figure 17, has certain advantages in that the flowing stream is established in a substantially uniform, steady-state condition at the earliest possible point in the stock conduit. In this connection, it should be noted that while the stream entering the flow spreader should be in a steady-state condition, it may not have a uniform velocity distribution across the width of the flow spreader. The arrangement has the disadvantage that the control vanes are located at a considerable distance from the web-forming region, and to that extent, the control effected in the critical region is reduced. As an alternative arrangement, the control vanes may be located at some other point in the flow spreading portion of the system closer to the web-forming region, and a set or plurality of sets of control vanes spaced along the stock conduit may be used. The arrangement of Figure 17 is, however, particularly adapted for incorporation into existing machine structures without material modification of the remaining portions of the stock conduit and flow spreading system.

Flow control means in accordance with the invention may be utilized in conjunction with the headbox-type papermaking machines as well as inlet type machines. In Figures 18, 19, and 20, for example, there is illustrated the web-forming end of a headbox-type papermaking machine which is provided with flow spreading and flow control means in accordance with the invention. In this machine, the stock is supplied to the headbox by way of a suitable stock inflow conduit or trough 175 which will be arranged to receive the output of the Bird or other stock screens (not shown).

The stock enters the headbox proper through a vertical conduit 177 which connects at its lower end with the interior of the headbox through a rectangularly-shaped inlet opening 179. The conduit 177 is suitably proportioned and dimensioned so that the stock which reaches the inlet opening 179 is in a substantially steady-state flow condition. The inlet opening 179 opens into the throat of a vertically-disposed, flow spreading section 181 which accomplishes the function of spreading the in-flowing stream of stock to the full width of the machine, and in the illustrated apparatus a flow control vane unit 183 in accordance with the invention is positioned at the inflow end of the flow spreader section 181.

As illustrated particularly in Figures 21 and 22, this flow control vane unit comprises a plurality of symmetrically-arranged flow control vanes 185 which are supported in fixed position upon a suitable bar or support plate 187. Each of the vanes 185 extends substantially completely across the width of the flow spreader section 181. The central vane 185a is flat, and each of the other vanes includes an arcuate leading section 189 and a flat trailing section 191. The arcuate sections 189 are cylindrical in form and constitute sections of right cylinders, the axes of which are perpendicular to the defining walls of the flow spreader section 181. Each of the vanes 185 and 185a is fabricated from thin sheet metal, and the curvature of the arcuate sections 189 increases outwardly from the central or base vane 185a as in the previously described structures. The side walls 193 of the throat portion of the flow spreader are curved to approximate the flow path in that region; and, to prevent the formation of stagnation areas at the outflow end of the flow spreader, suitable curved baffles 195 are provided in the outer edge portion thereof, as shown.

The flow control vane unit 183 is so constructed that it can be removed as a unit from the headbox for cleaning or other purposes, and then replaced without disturbing or changing the vane adjustment. This is made possible by the fixed mounting of each vane unit on the base plate 187 and by the use of suitable screw fastenings (not shown), whereby the entire unit is releasably attached to the headbox.

The forward defining wall 197 of the vertical flow spreader also serves as a rear wall of the headbox ponding chamber 199 and the stock flows over the top of this wall in passing into and through the headbox. To provide the usual circuitous flow path through the ponding chamber 199, a pair of adjustable baffles 201 and 203 are arranged in the path of flow subsequent to the outlet of the flow spreader 181, and a distributor or rectifying roll 205 may be employed adjacent the headbox outlet as shown. The stock is discharged from the headbox onto the wire, which is indicated at 207, through a suitable throttling slice indicated generally at 209. The ponding chamber 199 is proportioned and dimensioned, and the baffles 201 and 203 so positioned that the stock is maintained in a substantially uniform and steady-state flow condition from the flow spreading section 181 to the web-forming region of the machine.

The utilization of a flow spreader equipped with flow control vanes in connection with headbox-type machines, as described in the foregoing, has been found to accomplish very substantial improvement in the uniformity of delivery of the stock to the web-forming region of the machine with resultant improved web formation and increased operational speeds.

Another type of headbox machine utilizing flow control means in accordance with the invention is illustrated in Figures 23 and 24. This machine differs from the above described structure principally in that the stock is admitted to the headbox 211 through a plurality of spaced-apart inflow openings 213 which are square in outline and which are connected to a suitable stock supply manifold 215 by individual conduits 217. Each of the conduits 217 includes a transition section 219 which changes the cross-sectional outline of the flowing stream from a circular outline to the square outline of the stock inflow opening 213 with which it connects.

Control vanes 221 are located at the outflow end of each of the transition sections 219 and suitable baffles and end fillet sections 223 for defining the side walls of what constitutes, in effect, a plurality of diverging wall flow spreader sections are provided at the inflow portion of the headbox. The control vanes 221 follow the design principles previously set forth, and each includes an arcuate leading section 225 and a flat trailing section 227, which may be similar to the vanes 185. The edges of the vanes 221 and 221a are attached to an outlining frame or support member 229 and hence are fixed in position, similarly to the vanes 185. The stock passes through the headbox in a circular path as indicated by the arrows, which is defined by flow control baffles 231 and 233, and the portions of the headbox adjacent these baffles are desirably provided with curved insets 235 for preventing the formation of dead areas.

An example of air-forming equipment which utilizes flow control means in accordance with the present invention is illustrated somewhat diagrammatically in Figure 25. In this figure, fibre in the form of a very dense, self-sustaining bat 237 is fed into a picker roll or similar mechanism 239 by a feed roll 241. The picker roll 239 is located in the upper portion of a forming chamber 243. The picker roll 239 rotating against the end portion of the bat of fibers 237 produces a stream of separated fibers 245 which are directed toward a forming wire 247 which defines the lower end of the forming chamber 243. The forming wire 247 is in the form of an endless belt which is trained around and guided by suitable rolls 249.

Air is supplied to the forming chamber through inlet openings 251 and 253 in the form of wide and relatively narrow flowing streams of rectangular cross-section. The air streams within the forming chamber 243, which result from the delivery of air through the inlet openings 251 and 253, flow against and in the direction of the stream of fibers 245 and have the effect of controlling the width and position of the fiber stream 245. Air is drawn through the forming wire 247 into a suction box 255 which is connected by a suitable conduit 257 to the intake of a suction fan (not shown). The fibers in the stream 245 are deposited in the form of a loose web 259 on the forming wire 247. As the forming wire 247 emerges from the forming chamber 243, it passes between a pair of rubber-covered rolls 261 which are arranged to compress the web formed on the wire so as to cause a physical inter-attachment of the fibers to render the web 259 self-supporting.

The air which is directed into the forming chamber through the inlet openings 251 and 253 is supplied by a suitable blower (not shown). The air from the blower is directed into a main supply conduit 263, and thence into generally circular branched conduits 265. The conduits 265 connect with transition sections 267 which change the shape of the flowing air streams from a circular to a square outline. The transition sections 267 connect with the inflow ends of flow spreaders 269 which embody control vanes in accordance with the present invention. Each of the flow spreaders 269 is rectangular in cross-section and increases uniformly in width until it reaches the width of the forming chamber 243. Each of the flow spreaders 269 includes a removable section 273 which contains suitable control means 275 for controlling the flowing stream, which section may be generally similar to that illustrated in Figures 1 through 9. The outflow ends of the flow spreaders 269 connect with the conduits 271 which extend to and connect with the forming chamber 243.

Although one may provide a separate blower for supplying air to the conduit 263, for economic reasons and simplicity of construction, it is generally the practice to recirculate the air which passes into the forming chamber 243 and thence through the forming wire into the suction box 255, through the aid of a common suction fan and blower and a closed conduit system. The recirculated air generally includes fine fibers which pass through the forming wire 247. If desired, one may mix various materials with the fibers, by adding such materials to the air streams between the blower and the forming chamber 243, preferably within the conduit 265 which directs the air stream to the inlet opening 251 so that such materials are directed into the forming chamber 243 in the direction of movement of the fiber stream 245.

In accordance with the principles of the present invention, the conduits 265 and transition sections 267 are suitably proportioned and dimensioned so that the air streams reach the inlets to the flow spreaders 269 under substantially stable flow conditions; the flow spreaders 269 and control means 275 widen the streams and at the same time suitably adjust the pressure and velocity conditions transversely of the streams to attain conditions of substantially steady-state flow with substantially uniform pressure and velocity across the width of the widened streams at the outflow ends of the flow spreaders 269; and the conduits 271 which are connected between the outflow ends of the flow spreaders 269 and the forming chamber 243 are likewise suitably proportioned and dimensioned so that the air streams are maintained in substantially uniform and steady-state flow condition from the outlets of the flow spreaders 269 to the forming chamber 243.

In the foregoing, various means for effecting the control of flowing streams of liquids and gases within web-forming equipment have been disclosed. The flow control means of the present invention accomplishes sufficiently effective control of flowing streams of liquids and gases within web-forming equipment to assure uniform, as well as steady-state, flow throughout such streams at the web-forming region of the equipment. Structurally, the invention is relatively simple and may be easily embodied into the usual web-forming equipment at relatively low cost.

Flow control means in accordance with the invention accomplishes the desired flow control without introducing any substantial pressure drop or head loss into the system; the flow control means of the invention thus operates at very high efficiencies. In addition, the flow control means are designed so that there is practically no tendency for the fibers to accumulate and form into stock lumps therealong or for the web-forming equipment to foul or clog during use, even when fibrous suspensions of relatively high concentrations are contained in the flowing stream which is being controlled.

Other important advantages of the invention result from the fact that the flow control vanes or shafts are readily adjustable, thereby adapting any particular set of controls or any particular control unit for use in conjunction with any one of a plurality of associated web-forming machines, or for use under varying operating conditions. The capability of the flow control means of the invention to effectively control flowing streams at very wide divergence angles is likewise an important feature of the invention because of the resulting economic advantages and the reduction of the sizes of equipment, buildings, etc.

Various features of the invention which are believed to be new are set forth in the accompanying claims.

I claim:

1. Flow control apparatus for web-forming equipment comprising an inflow conduit for containing a flowing stream of fluid and establishing said stream of fluid in a substantially steady-state flow condition at the outflow end of said inflow conduit, a laterally-diverging conduit connected to said inflow conduit at the outflow end thereof for receiving the flowing stream of fluid from said inflow conduit, a plurality of symmetrically spaced, flow control vanes disposed within the throat of said diverging conduit in position to act upon said flowing stream to establish said fluid in a substantially steady-state flow condition with substantially uniform pressure and velocity distribution across the width of the widened stream at the outflow end of the diverging conduit, each of a plurality of said flow control vanes having a section of predetermined curvature at the upstream end thereof and a section of less curvature at the downstream end thereof, the gap to chord ratio of said flow control vanes being within the range of from 1:2 to 1:4, and an outflow conduit connected to the outflow end of said laterally-diverging conduit for carrying said widened flowing stream to the web-forming region of said web-forming equipment while maintaining said widened flowing stream of fluid in said substantially uniform and steady-state flow condition.

2. Flow control apparatus for web-forming equipment comprising an inflow conduit for containing a flowing stream of fluid and establishing said stream of fluid in a substantially steady-state flow condition at the outflow end of said inflow conduit, a laterally-diverging conduit connected to said inflow conduit at the outflow end thereof for receiving the flowing stream of fluid from said inflow conduit, a plurality of symmetrically spaced, flow control vanes disposed within the throat of said diverging conduit in position to act upon said flowing stream to establish said fluid in a substantially steady-state flow condition with substantially uniform pressure and velocity distribution across the width of the widened stream at the outflow end of the diverging conduit, each of a plurality of said flow control vanes having a curved section at the up-stream end and a flat section at the downstream end, which merges smoothly into said curved section, the gap to chord ratio of said control vanes being within the range of from 1:2 to 1:4, and an outflow conduit connected to the outflow end of said laterally-diverging conduit for carrying said widened flowing stream to the web-forming region of said web-forming equipment, while maintaining said widened flowing stream of fluid in said substantially uniform and steady-state flow condition.

3. Apparatus as defined in claim 1, wherein each of the flow control vanes comprises a longitudinally extending, generally parallelogram-shaped plate, the forward and rearward edges of said plate sloping downwardly and rearwardly with the forward edge merging smoothly with the lower edge of said plate through a curved section, a generally laterally extending, elongated boss extending above and along the upper edge of said plate with the forward edge of said boss merging smoothly with the forward edge of said plate, said elongated boss having an upper surface extending generally transversely to the plane of said plate and a lower surface which is beveled upwardly in a direction outwardly from the surfaces of said plate, the extreme rearward end of said plate being tapered to a reduced thickness, and a spindle extending transversely to and connected at its lower end to the center of said elongated boss.

4. Apparatus as defined in claim 3, wherein each of the vane spindles are pivoted within a support means which permits the vane to be rotated for adjusting the position of the vane and means for locking each of the vanes in adjusted position.

5. Apparatus as defined in claim 4, wherein each of the vane spindles extends through a wall of the laterally-diverging conduit and the upper, generally transverse surface of each of the generally laterally extending, elongated bosses are seated against the inwardly facing surface of said laterally-diverging conduit wall.

6. Flow control apparatus for web-forming equipment comprising an inflow conduit for containing a flowing stream of fluid and delivering said stream of fluid under conditions approximating steady-state flow, a laterally-diverging conduit connected to the outflow end of said inflow conduit for receiving the flowing stream of fluid from said inflow conduit, a plurality of spaced-apart flow control members positioned within the throat of the laterally-diverging conduit so as to divide said throat into substantially equal angular segments, each of which angular segments encompasses a divergence angle of between about 3° and about 15°, the flow control members having dimensions and characteristics so as to alter the dynamic relationships of the portions of the stream flowing adjacent said members and establish said fluid in a substantially steady-state flow condition with substantially uniform pressure and velocity distribution across the width of the widened stream at the outflow end of the laterally-diverging conduit, and an outflow conduit connected to the outflow end of said laterally-diverging conduit for carrying said widened flowing stream to the web-forming region of said web-forming equipment while maintaining said widened flowing stream of fluid in said substantially uniform and steady-state flow condition.

7. Apparatus as defined in claim 6, wherein the flow control members constitute rotatable shafts and wherein said apparatus includes means for rotating each of said shafts at individually controllable speeds.

8. Apparatus as defined in claim 6, wherein the flow control members constitute one or more guide vanes, each of said guide vanes comprising a longitudinally extending plate, the forward edge of said plate sloping downwardly and rearwardly and merging smoothly with the lower edge of said plate through a curved section, a generally laterally extending, elongated boss extending above and along the upper edge of said plate with the forward edge of said boss merging smoothly with the forward edge of said plate, said elongated boss having an upper surface extending generally transversely to the plane of said plate and a lower surface beveled upwardly in a direction outwardly from the surface of said plate, and a spindle extending transversely to and connected at its lower end to the center of said elongated boss.

9. Apparatus as defined in claim 8, wherein each of the vane spindles are pivoted within a support means which permits the vane to be rotated for adjusting the position of the vane and means for locking each of the vanes in adjusted position.

10. Apparatus as defined in claim 9, wherein each of the vane spindles extends through a wall of the laterally-diverging conduit, and the upper, generally transverse surface of each of the generally laterally extending, elongated bosses are seated against the inwardly facing surface of said laterally-diverging conduit wall.

11. A streamlined guide vane for controlling the flow of fluid within web-forming equipment comprising a longitudinally extending plate, a generally laterally extending, elongated boss extending above and along the upper edge of said plate with the forward edge of said boss merging smoothly with the forward edge of the plate, said elongated boss having an upper surface which extends generally transversely to the plane of said plate and a lower surface which is beveled upwardly in a direction outwardly from the surfaces of said plate, and a spindle extending transversely to and connected at its lower end to the center of said elongated boss.

12. A streamlined guide vane for controlling the flow of fluid within web-forming equipment comprising a longitudinally extending plate, the forward edge of said plate sloping downwardly and rearwardly and merging smoothly with the lower edge of said plate through a curved section, a generally laterally extending, elongated boss extending above and along the upper edge of said plate with the forward edge of said boss merging smoothly with the forward edge of the plate, said elongated boss having an upper surface which extends generally transversely to the plane of said plate and a lower surface which is beveled upwardly in a direction outwardly from the surfaces of said plate, and a spindle extending transversely to and connected at its lower end to the center of said elongated boss.

13. A streamlined guide vane for controlling the flow of fluid within web-forming equipment comprising a longitudinally extending, generally parallelogram-shaped plate, the forward and rearward edges of said plate sloping downwardly and rearwardly with the forward edge merging smoothly with the lower edge of said plate through a curved section, the forward end portion of said plate being curved and the rearward end portion of said plate being flat, a generally laterally extending, elongated boss extending above and along the upper edge of said plate with the forward edge of said boss merging smoothly with the forward edge of the plate, said elongated boss having a generally diamond shaped form with an upper surface which extends generally transversely to the plane of said plate and a lower surface which is beveled upwardly in a direction outwardly from the surfaces of said plate, the extreme rearward end of said plate being tapered to a reduced thickness, and a spindle extending transversely to and connected at its lower end to the center of said elongated boss.

14. Flow control apparatus for web-forming equipment comprising an inflow conduit for containing a flowing stream of fluid and establishing said stream of fluid in a substantially steady-state flow condition at the outflow end of said inflow conduit, a laterally-diverging conduit connected to said inflow conduit at the outflow end thereof for receiving the flowing stream of fluid from said inflow conduit, a plurality of spaced-apart flow control vanes which are positioned within the throat of the laterally-diverging conduit so as to divide said throat into substantially equal angular segments, each of which angular segments encompasses a divergence angle of not more than about 15°, each of a plurality of said flow control vanes having a section of predetermined surface curvature at the up-stream end thereof and a section of less curvature at the down-stream end thereof so as to act upon the flowing stream to establish said fluid in a substantially steady-state flow condition with substantially uniform pressure and velocity distribution across the width of the widened stream at the outflow end of the laterally-diverging conduit and an outflow conduit connected to the outflow end of said laterally-diverging conduit for carrying said widened flowing stream to the web-forming region of said web-forming equipment while maintaining said widened flowing stream of fluid in said substantially uniform and steady-state flow condition.

15. Flow control apparatus for web-forming equipment comprising an inflow conduit for containing a flowing stream of fluid and establishing said stream of fluid in a substantially steady-state flow condition at the outflow end of said inflow conduit, a laterally-diverging conduit connected to said inflow conduit at the outflow end thereof for receiving the flowing stream of fluid from said inflow conduit, a plurality of spaced-apart flow control vanes which are positioned within the throat of the laterally-diverging conduit so as to divide said throat into substantially equal angular segments, each of which angular segments encompasses a divergence angle of not more than about 15°, the flow control vane located nearest the central axis of said flowing stream being flat and the other flow control vanes having a section of predetermined surface curvature at the up-stream end thereof and a flat section at the down-stream end thereof which merges smoothly into said curved section so as to act upon the flowing stream to establish said fluid in a substantially steady-state flow condition with substantially uniform pressure and velocity distribution across the width of the widened stream at the outflow end of the laterally-diverging conduit, and an outflow conduit connected to the outflow end of said laterally-diverging conduit for carrying said widened flowing stream to the web-forming region of said web-forming equipment while maintaining said widened flowing stream of fluid in said substantially uniform and steady-state flow condition.

16. Flow control apparatus for web-forming equipment comprising an inflow conduit for containing a flowing stream of fluid and establishing said stream of fluid in a substantially steady-state flow condition at the outflow end of said inflow conduit, at least the outflow end of said conduit being of generally rectangular cross-section, a laterally-diverging conduit of rectangular cross-section connected to said inflow conduit at the outflow end thereof for receiving the flowing stream of fluid from said inflow conduit, said laterally-diverging conduit decreasing in depth in the direction of flow therethrough, a plurality of spaced-apart flow control vanes positioned within the throat of the laterally-diverging conduit so as to divide said throat into substantially equal angular segments, each of which angular segments encompasses a divergence angle of between about 3° and about 15°, said flow control vanes having dimensions and characteristics so as to act upon said flowing stream to establish said fluid in a substantially steady-state flow condition with substantially uniform pressure and velocity distribution across the width of the widened and shallowed stream at the outflow end of the diverging conduit, the flow control vane located nearest the central axis of said flowing stream being flat and the other of said flow control vanes each having a section of predetermined surface curvature at the upstream end thereof and a section of less curvature at the down-stream end thereof, the vanes on opposite sides of said flat vane being curved in opposite directions, and a generally rectangular outflow conduit connected to the outflow end of said laterally-diverging conduit for carrying said widened and shallowed flowing stream to the web-forming region of said web-forming equipment while maintaining said widened and shallowed, generally rectangular flowing stream of fluid in said substantially uniform and steady-state flow condition.

17. Flow control apparatus for web-forming equipment comprising an inflow conduit for containing a flowing stream of fluid and establishing said stream of fluid in a substantially steady-state flow condition at the outflow end of said inflow conduit, at least the outflow end of said conduit being of generally rectangular cross-section, a laterally-diverging conduit of rectangular cross-section connected to said inflow conduit at the outflow end thereof for receiving the flowing stream of fluid from said inflow conduit, said laterally-diverging conduit decreasing in depth in the direction of flow therethrough, a plurality of spaced-apart flow control vanes positioned within the throat of the laterally-diverging conduit so as to divide said throat into substantially equal angular segments, each of which angular segments encompasses a divergence angle of between about 3° and about 15°, said flow control vanes having dimensions and characteristics so as to act upon said flowing stream to establish said fluid in a substantially steady-state flow condition with substantially uniform pressure and velocity distribution across the width of the widened and shallowed stream at the outflow end of the diverging conduit, the flow control vane located nearest the central axis of said flowing stream being flat and the other of said flow control vanes each having a curved section at the up-stream end thereof and a flat section at the down-stream end thereof, which merges smoothly into said curved section, the curved sections at opposite sides of said flat vane being curved in opposite directions and the degree of curvature in said vanes increasing outwardly from said flat vane, and a generally rectangular outflow conduit connected to the outflow end of said laterally-diverging conduit for carrying said widened and shallow flowing stream to the web-forming region of said web-forming equipment while maintaining said widened and shallowed, generally rectangular flowing stream of fluid in said substantially uniform and steady-state flow condition.

18. Flow control apparatus for web-forming equipment comprising an inflow conduit for containing a flowing stream of fluid and establishing said stream of fluid in a substantially steady-state flow condition at the outflow end of said inflow conduit, at least the outflow end of said conduit being of generally rectangular cross-section, a laterally-diverging conduit of rectangular cross-section connected to said inflow conduit at the outflow end thereof for receiving the flowing stream of fluid from said inflow conduit, said laterally-diverging conduit decreasing in depth in the direction of flow therethrough, a plurality of spaced-apart flow control vanes positioned within the throat of the laterally-diverging conduit so as to divide said throat into substantially equal angular segments, each of which angular segments encompasses a divergence angle of between about 3° and about 6°, said flow control vanes having dimensions and characteristics so as to act upon said flowing stream to establish said fluid in a substantially steady-state flow condition with substantially uniform pressure and velocity distribution across the width of the widened and shallowed stream at the outflow end of the diverging conduit, the flow control vane located nearest the central axis of the flowing stream being flat and the other flow control vanes each havilng a cylindrically curved section of predetermined surface curvature at the up-stream end thereof and a flat section at the down-stream end thereof which merges smoothly into said curved section, the curved sections at opposite sides of said flat vane being curved in opposite directions, and a generally rectangular outflow conduit connected to the outflow end of said laterally-diverging conduit for carrying said widened and shallowed flowing stream to the web-forming region of said web-forming equipment while maintaining said widened and shallowed, generally rectangular flowing stream of fluid in said substantially uniform and steady-state flow condition.

19. A streamlined guide vane for controlling the flow of fluid within web-forming equipment comprising a longitudinally extending, generally parallelogram-shaped plate, the forward and rearward edges of said plate sloping downwardly and rearwardly, with the forward edge of said plate merging smoothly with the lower edge of said plate through a curved section.

References Cited in the file of this patent

UNITED STATES PATENTS

| | | |
|---|---|---|
| 1,771,600 | Yoder | July 29, 1930 |
| 1,846,406 | Sweeney | Feb. 23, 1932 |
| 1,909,150 | Bell-Irving et al. | May 16, 1933 |
| 2,083,187 | Anderson | June 8, 1937 |
| 2,205,693 | Milne | June 25, 1940 |
| 2,339,711 | Lowe et al. | Jan. 18, 1944 |
| 2,402,063 | Malkin | June 11, 1946 |
| 2,608,912 | Davis | Sept. 2, 1952 |
| 2,688,277 | Luebke | Sept. 7, 1954 |
| 2,688,285 | Stockett et al. | Sept. 7, 1954 |
| 2,688,905 | Hornbostel | Sept. 14, 1954 |

FOREIGN PATENTS

| | | |
|---|---|---|
| 509,287 | Great Britain | July 13, 1939 |